United States Patent [19]

Norden

[11] Patent Number: 4,966,561
[45] Date of Patent: Oct. 30, 1990

[54] FUSE HOLDERS

[75] Inventor: Alexander R. Norden, New York, N.Y.

[73] Assignee: Connectron, Inc., Laurence Harbor, N.J.

[21] Appl. No.: 359,130

[22] Filed: May 31, 1989

[51] Int. Cl.$^5$ ............................................ H01R 13/66
[52] U.S. Cl. ..................................... 439/622; 337/211
[58] Field of Search ............... 439/157, 206, 713, 715, 439/830, 832, 833, 835, 838, 890, 893; 337/211, 213, 217

[56] References Cited

U.S. PATENT DOCUMENTS 2,011,391  8/1935  Bennett .......................... 439/833 X
2,762,878  9/1956  Wills ..................................... 200/50

Primary Examiner—Eugene F. Desmond

[57] ABSTRACT

The described fuse holders include a receptacle unit and a fuse-carrier unit having means, especially a lever, for driving the units apart and forcing the release of the contacts of each unit from the other. Multiple single-fuse fuse holders can be ganged for operation coordinately. A wire shroud fixed to the receptacle serves also as a releasable latch to hold the receptacle on a mounting rail. The receptacle is adaptable either to have wire connections or rear stud terminals.

18 Claims, 6 Drawing Sheets

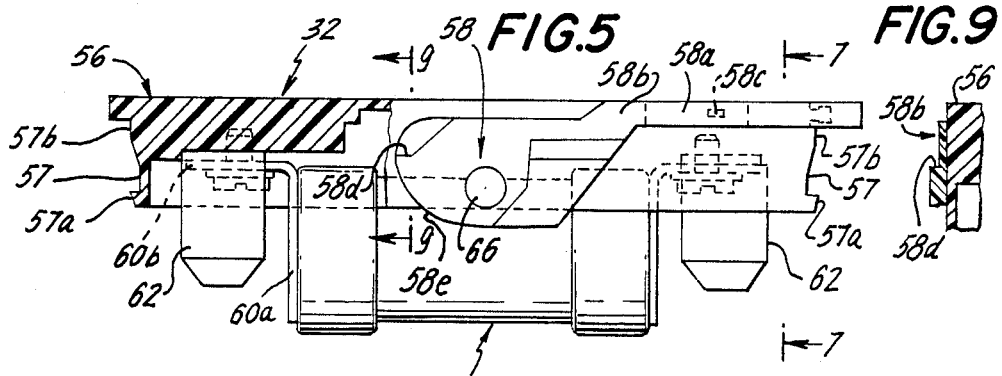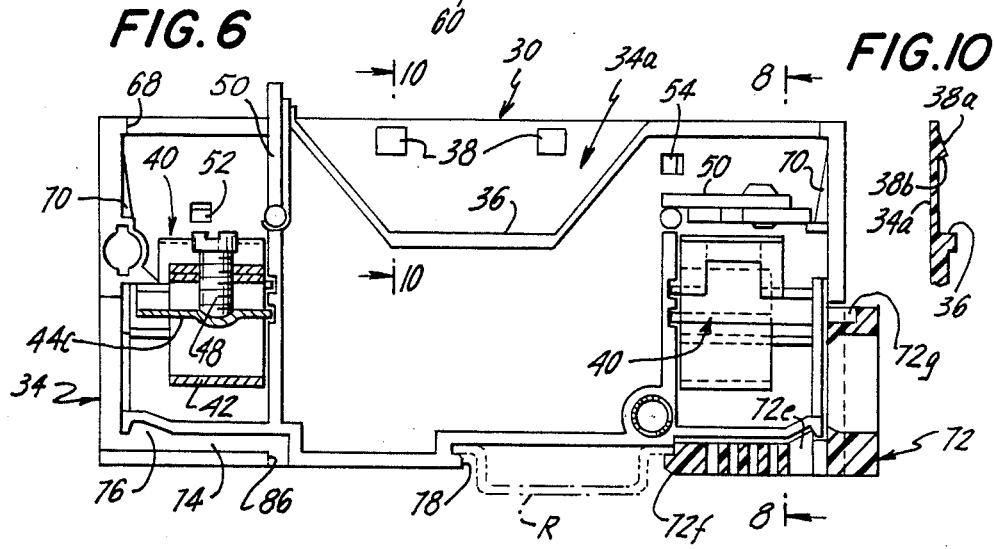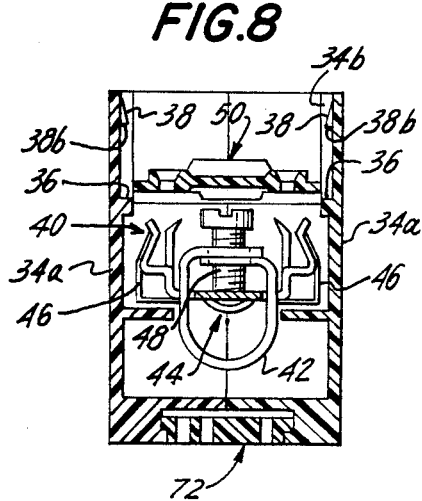

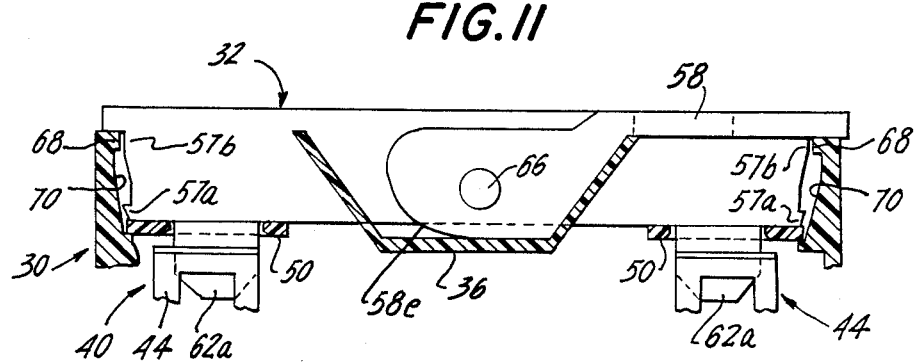
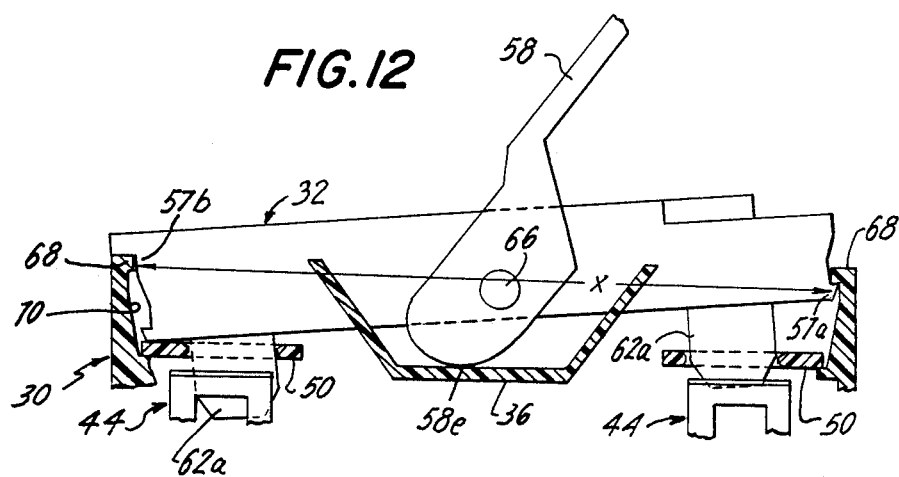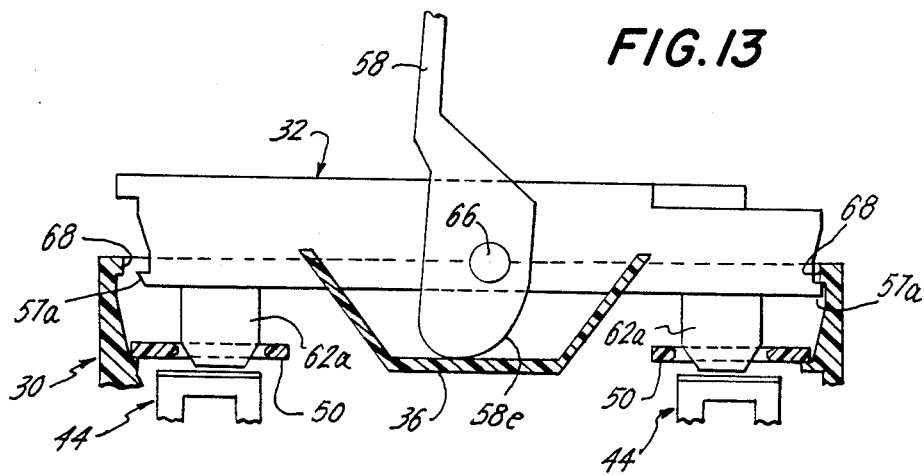

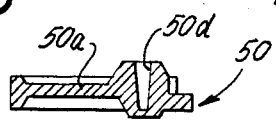
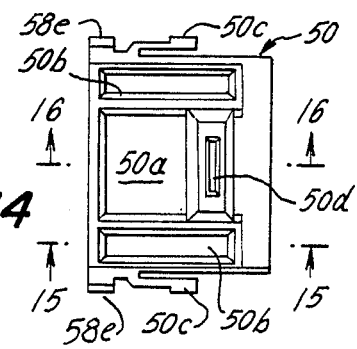
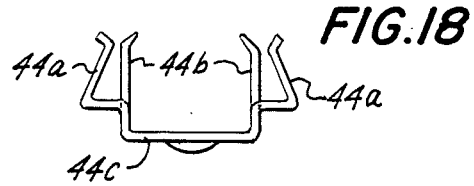
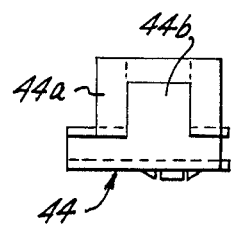
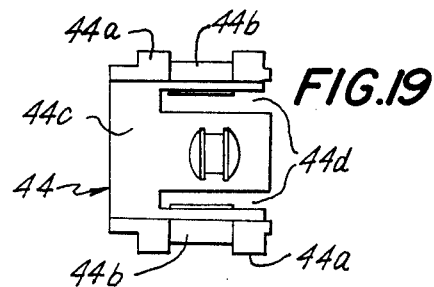
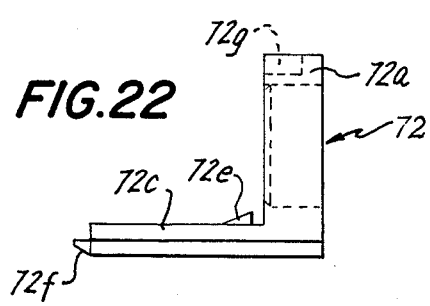
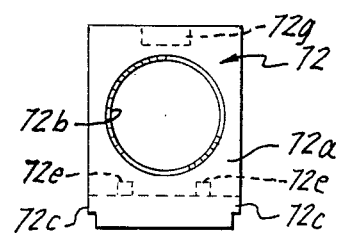
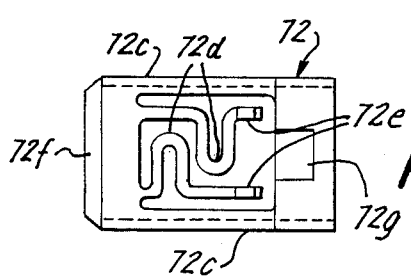

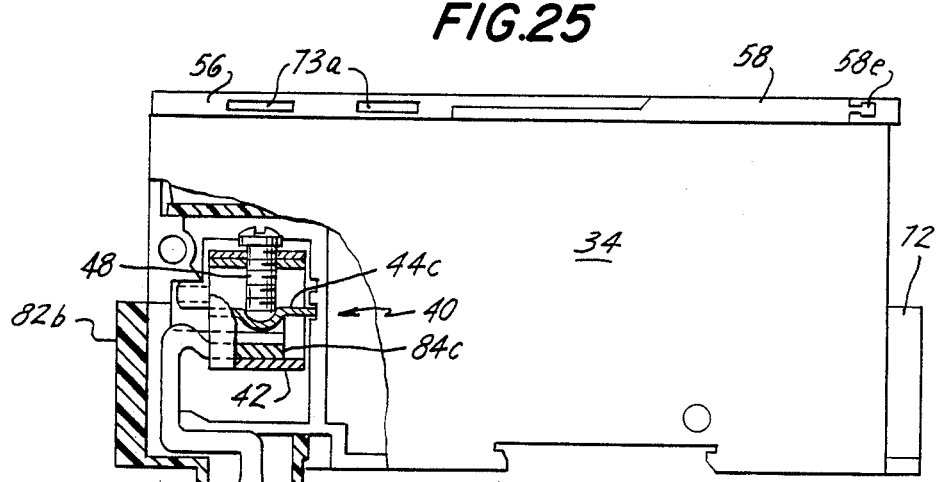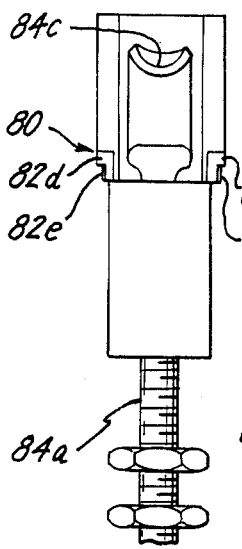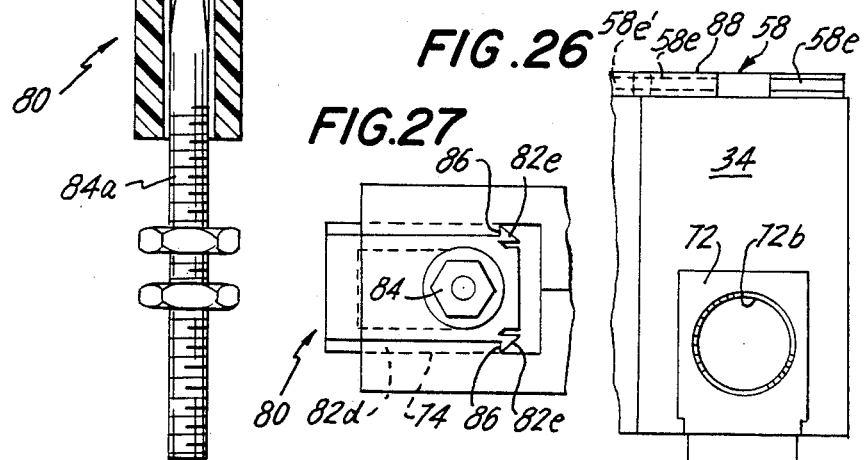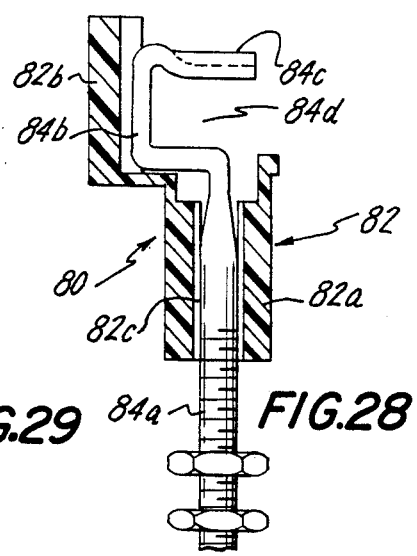

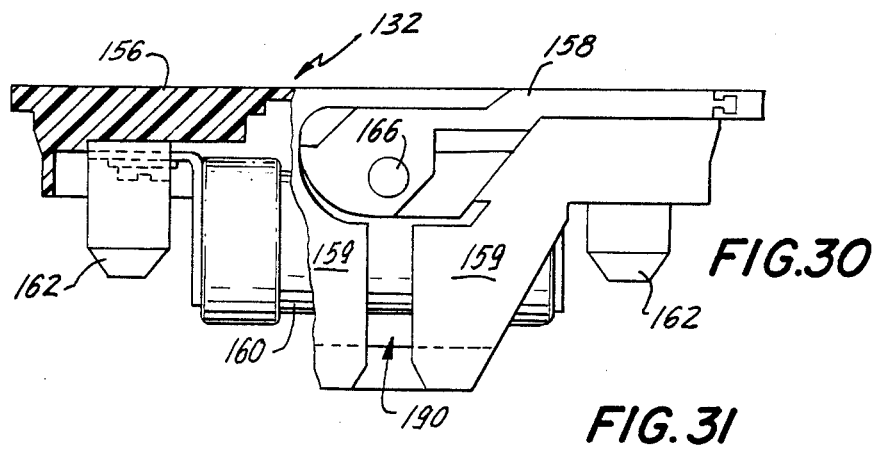
FIG. 30
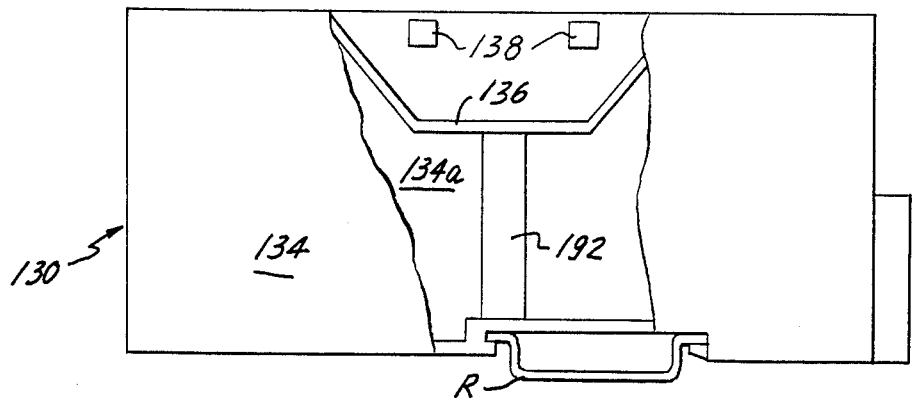
FIG. 31
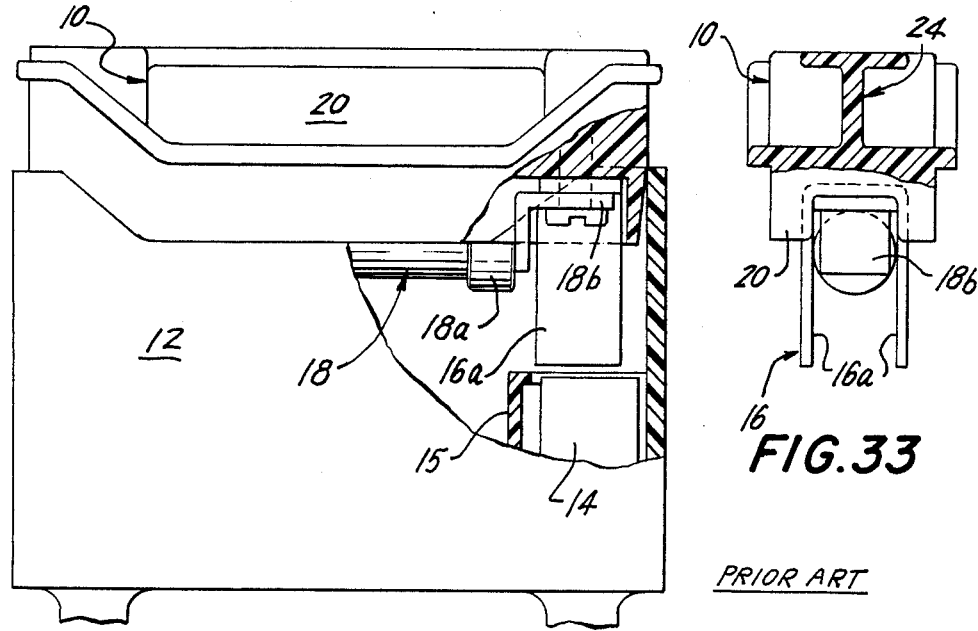
FIG. 32
FIG. 33
PRIOR ART

FUSE HOLDERS

The present invention relates to electrical apparatus commonly called fuse holders.

A "fuse holder" includes a fuse carrier or fuse-carrier unit and a receptacle or receptacle unit. In use, a fuse carrier bears one or more elongated fuses each of which has a pair of terminals. The fuse carrier has a pair of spaced-apart contacts for each fuse for tight engagement with companion contacts of the receptacle. The fuse-carrier contacts are usually blades, although they may have other forms and in some examples the fuse terminals are used directly as the fuse-carrier contacts.

Fuse holders to which the present invention relates are proportioned for what may be called low-voltage application, i.e., under 1000 volts. The fuse carrier commonly comprises a body of molded insulation and the receptacle has a base of molded insulation, formed of one part or multiple unified parts.

In use, fuse receptacles are fixed in place, as on a panel. The fuse carrier is a hand-held unit that is manually assembled to and removable from the receptacle. Fuse carriers are routinely assembled to their receptacles by being pushed into place but, when the fuse carrier is to be removed, it must be gripped firmly in order to develop the pull-out force for releasing the tight hold of the fuse-carrier contacts and their companion receptacle contacts. For this reason, fuse carriers have prominent hand-grip formations, these being particularly large and bulky where high-current fuses are involved and where the fuse carrier has multiple fuses. Pulling a fuse carrier away from its receptacle is usually difficult and therefore it must be gripped forcefully.

The novel fuse holders shown in the drawings and described below incorporate manual force-multiplied means for driving the fuse-carrier outward, for releasing the tight grip of the contacts of a fuse carrier and its receptacle. More specifically, the force-multiplying means in the described novel fuse holders is a lever or two levers linked together as a dual lever, pivoted to one unit of the fuse holder and acting against the other unit of the fuse holder. In one of the described novel fuse holders, the opposite-end contacts of the fuse carrier are forcibly released concurrently from the receptacle contacts. In the preferred fuse holder, the fuse-carrier is tilted in being drawn out of its receptacle, in this way releasing the contact at one end of the fuse carrier from its companion contact in the receptacle. The opposite-end companion contacts remain engaged and are released later. The force that is applied in manually operating the lever is considerably less than the direct-pull effort heretofore used in pulling a fuse carrier loose of its receptacle. In turn, because the required pull is sharply reduced, the force that is imposed on the fuse holder's mounting fasteners and on the fuse panel is considerably reduced. The previous bulky hand-grips of the fuse carrier are omitted, resulting in a newly compact device.

Each fuse holder detailed below contains one fuse, being a single-pole device for interrupting a single current path. The novel fuse holders might be designed to accommodate plural fuses, to interrupt plural current paths. Multiple single-pole fuse holders as described can be mounted side-by-side and they can be adapted to interrupt multiple current paths concurrently by linking their levers together, as a further aspect of the invention.

A common form of circuit connection to the receptacle contacts of a fuse holder is by wires that enter the receptacle, joined to the receptacle contacts by screw-actuated wire fasteners. In the operative condition of the fuse holder, shields cover the receptacle contacts to avoid the hazard of receptacle contacts being exposed while the circuit is energized and the fuse carrier has been removed from the receptacle. The shields are moved away from the receptacle contacts when the screw-actuated wire fasteners must be manipulated to connect the inserted wires (or cables) to the receptacle contacts.

In the novel fuse holders detailed below, these shields are movable on pivots between their safe contact-shrouding positions over the receptacle contacts and raised positions in which access is provided to the screw-actuated wire fasteners. In their raised positions, the shields act as flags that prominently signal the need to return the shields to their safe contact-shrouding positions and the raised shields also serve as obstructions against inserting the fuse carrier.

When an insulated wire (or cable) is inserted into a receptacle, to be fixed to a receptacle contact, the insulation is stripped from a short length of the wire. The receptacle is often equipped with an inserted shield or wire-end shroud that covers a short length of the wire insulation adjacent to the bared end-portion of the wire. It is also common to mount fuse holders side-by-side on a so-called DIN mounting rail (or other rail), retained by a sliding latch. In the novel fuse holders detailed below, the functions of the wire-end shroud and the rail latch are performed by a single sliding member that is releasably latched to the receptacle base.

Two types of fuse holders are available, one type in which wires are inserted into the wire fasteners of a receptacle, and another type in which terminal studs extend rigidly rearward of the receptacle, serving both for mounting the receptacle on a supporting panel or other structure and for making electrical connection to the receptacle's contacts. Pursuant to a further aspect of the invention, a single form of fuse holder is adapted for use with two mounting and connection studs, or for use with one mounting-and-connection stud and an inserted wire, or as a fuse holder adapted for use with two inserted wires or cables. This flexibility is achieved by means of a novel terminal stud that enters the receptacle and is connected to a receptacle contact by means of the same screw-actuated fastener that is provided for securing an inserted wire or cable to the receptacle contact.

The nature of the invention and its further novel aspects will be more fully understood from the following description of a preferred embodiment thereof and a modification which are shown in the accompanying drawings.

IN THE DRAWINGS

FIG. 5 is a lateral view of a fuse carrier, partly in cross-section, being one of the two units forming the fuse holder of FIGS. 1-4;

FIG. 6 is a lateral view of a receptacle for the fuse carrier of FIG. 5, partly in cross-section, being a second unit forming the fuse holder of FIGS. 1-4, FIG. 6 omitting one side part of two basically mirror-image parts of the receptacle's base, one contact shield being raised for access to a screw clamp;

FIG. 7 is a vertical cross-section of the fuse carrier as seen at the plane 7—7 in FIG. 5;

FIG. 8 is a vertical cross-section of the fuse receptacle as seen at the plane 8—8 in FIG. 6;

FIG. 9 is a fragmentary cross-section of the fuse carrier as seen at the plane 9—9 in FIG. 5;

FIG. 10 is a fragmentary cross-section of the base of the receptacle as seen at the plane 10—10 in FIG. 6;

FIGS. 11-13 are views, partly in cross-section, of the fuse carrier and a fragment of the receptacle forming the fuse holder of FIGS. 1-4, FIGS. 11-13 representing the fuse carrier in progressive conditions of being withdrawn from the receptacle, FIG. 11 showing the fuse carrier assembled to the receptacle, FIG. 12 showing contacts at one end disengaged, and FIG. 13 showing the contacts at both ends of the two units disengaged.

Figure 1:
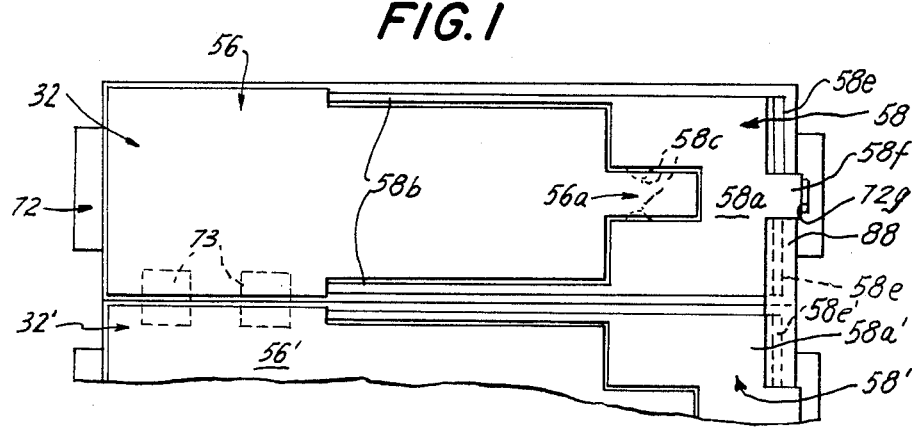
FIG. 1 is a top plan view of a novel fuse holder and a fragmentary top plan view of a second fuse holder linked to the first.
Figure 2:
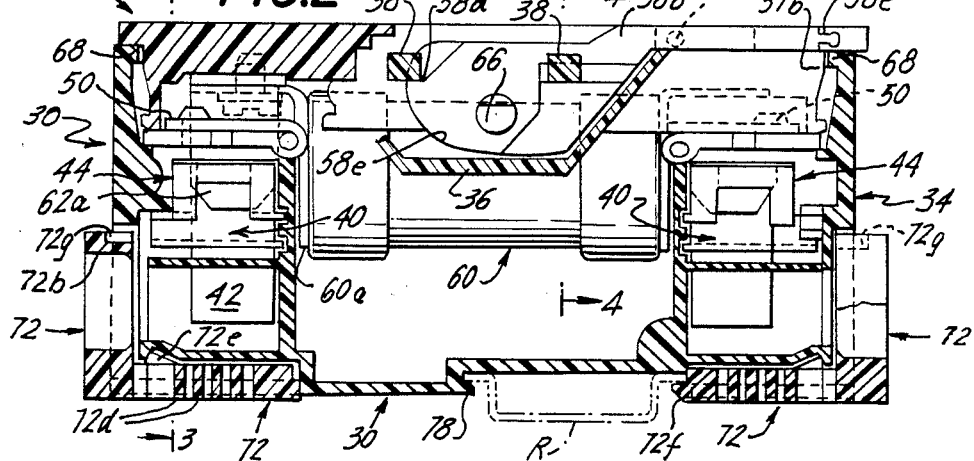
FIG. 2 is a cross-section of the fuse holder in FIG. 1 as viewed from the broken section line 2—2 in FIG. 3.
Figure 3:
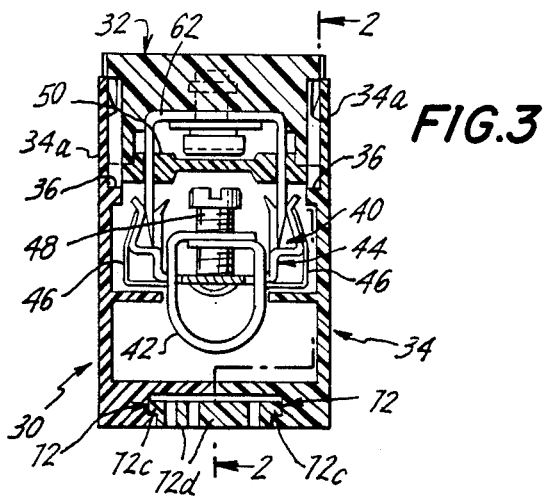
FIG. 3 is a cross-section of the fuse holder of FIGS. 1 and 2 as viewed at the plane 3—3 in FIG. 2.
Figure 4:
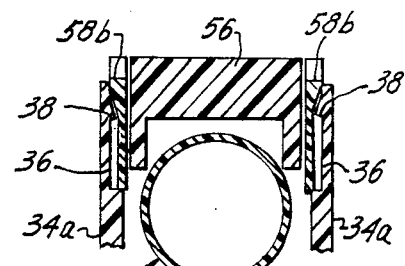
FIG. 4 is a fragmentary cross-section of the fuse holder of FIGS. 1–3 as viewed from the plane 4—4 in FIG. 2.

FIGS. 14-16 show a contact shield, two of which are used in the receptacle shown in FIG. 2, 4, 6, 8 and 11-13, FIGS. 14-16 being drawn to a scale slightly larger than that of FIGS. 1-10, wherein FIG. 14 is a top plan view, and FIGS. 15 and 16 are vertical-plane cross-sections of the contact shield of FIG. 14 at the planes 15—15 and 16—16 in FIG. 14;

FIGS. 17-19 show a contact, two of which are used in the receptacle of FIGS. 2, 4, 6 and 8, FIG. 17 being a side elevation, FIG. 18 being a view of the contact of FIG. 17 looking toward the right, and FIG. 19 being a bottom plan view of the contact of FIG. 17;

FIGS. 20 and 21 are side and end views of a leaf-spring two of which are used with each contact of FIGS. 17-19;

FIGS. 22-24 are a side view, a right-hand end view and a top plan view of a combined wire shroud and rail latch that is used at one end of the receptacle, as shown in FIGS. 2 and 3, and at the right in FIG. 25;

FIG. 25 is a side view, partly in cross-section, of the fuse holder of FIGS. 2 and 3 incorporating a terminal and mounting stud, replacing the left-hand wire shroud 72 of FIG. 2;

FIG. 26 is a right-hand elevation of the whole and partial fuse holders of FIGS. 1 and 2, modified as in FIG. 25;

FIG. 27 is a fragmentary bottom plan view of the left end of the fuse holder of FIG. 25;

FIG. 28 is a side elevation, partly in cross-section, of a terminal stud unit, being a component part of FIG. 25;

FIG. 29 is a right-side elevation of the terminal stud and mounting unit of FIG. 28;

FIGS. 30 and 31 are lateral views of a modification of the fuse carrier and receptacle of FIGS. 5 and 6, respectively, portions being broken away and shown in cross-section;

FIG. 32 is a side view of a prior art fuse holder, the fuse-carrier being partially withdrawn from the receptacle, portions of both being broken away and shown in cross-section to show internal components; and FIG. 33 is an end view of the fuse carrier shown in FIG. 32, partially in cross-section, portions being broken away to show inner details.

PRIOR ART FUSIBLE DEVICE

The fuse holder of FIGS. 32 and 33 is a representative form of commercial fuse holders. It includes a fuse carrier 10 and a base or receptacle 12. The receptacle has a contact 14 in one end of its body of molded insulation and a duplicate contact (not shown) in the opposite end. Each contact 14 is shrouded by a shield 15 of insulation.

At the right in FIG. 32, fuse carrier 10 has a U-shaped stab or contact member 16 comprising parallel contact blades 16a. A fuse 18 in the fuse carrier has two terminals, each comprising a ferrule 18a and an L-shaped bracket 18b, one arm of which is united to a ferrule 18a. The other arm of bracket 18b and contact member 16 are fixed to each other and to body 20 of insulation by a screw. A second two-blade contact member (not shown) like member 16 is fixed to the second terminal of the fuse and to the fuse carrier's body 20. When the fuse holder is in use, the contact blades of the fuse carrier are gripped tightly by the receptacle's contacts.

In FIG. 32, the fuse holder is shown with the extremities of blades 16a close to contact member 14 before making contact or just after breaking contact. Shield 15 over receptacle contact 14 has paired slots through which the fuse carrier's blades enter the receptacle's contacts. When the fuse carrier is removed, each shield 15 shrouds its contact 14, preventing the receptacle contacts from being touched accidentally.

The top of fuse carrier 10 and the bottom of receptacle 12 as shown in FIG. 32 are the front and back of an assembled and installed fuse holder. In common practice, many fuse holders are mounted side-by-side on a panel.

Fuse carrier 10 must be pulled forward to release its contact blades 16a from the grip of the receptacle contacts. A fuse holder for fuses of high current ratings accordingly has large tightly gripping contacts. The devices that attach the receptacle to the panel, and the panel itself, must be made strong enough to withstand the force needed to pull the fuse carrier out of its receptacle.

The hand-grip portion of the fuse carrier 10 is of substantial size, particularly in fuse holders for fuses of larger current ratings, to enable the user to grasp and pull the fuse carrier out of the receptacle. A significant part of the front-to-back dimension of the fuse holder is needed for the finger grip. In a commercial example, the finger-grip structure preempts roughly ¾-inch of the front-to-back dimension of the fuse holder. Fuse holders for high-current fuses have still larger finger grips.

An Illustrative Embodiment

FIGS. 1-13 show a novel fuse holder comprising two units, namely, a receptacle 30 and a fuse carrier 32. FIGS. 14-21 are views of component parts of the fuse holder of FIGS. 1-13.

Receptacle 30 has a body of insulation 34 formed of two united parts that are essentially mirror images of each other. Walls 34a of body 34 are spaced-apart sides of a cavity of the receptacle 30. Walls 34a have mutually opposite mirror-image ribs 36 that serve as cam surfaces. Oppositely aligned pairs of detents 38 extend inward from walls 34a. Detents 38 have upper surfaces 38a (FIG. 10) that slant downward and toward each other, ending at oppositely aligned shoulders 38b. Ribs 36 and detents 38 cooperate effectively with lever 58 (to be described) regardless of end-to-end reversal of the fuse carrier in relation to the receptacle.

Receptacle 30 contains spaced-apart terminal assemblies 40 (FIGS. 3, 6 and 8), close to the opposite ends of the receptacle. Each terminal assembly 40 in this illustrative apparatus includes a clamp 42 for receiving an inserted conductor, a contact member 44, a pair of leaf springs 46, and a screw 48 for operating each clamp 42. Contact member 44 consists of a single resilient sheet-metal component (FIGS. 17, 18 and 19) comprising first and second contact pairs 44a, 44b extending from a base portion 44c. Contacts 44a and base 44c in FIG. 17 resemble a distorted, inverted "U", and each contact 44b is a blade struck from the opening of its companion contact 44a. Slots 44d in base portion 44c admit leaf springs 46 (FIGS. 20 and 21) for developing firm contact pressure of each contact pair 44a, 44b against a respective blade of the fuse carrier 32. Each contact member 44 is secured in place by edge projections that extend into corresponding recesses in body 34. Screw 48 is threaded through the double-thickness top wall of each clamp 42 and each screw bears against base portion 44c of contact member 44, for tightening an inserted wire against the contact member.

As seen in FIGS. 2, 3, 6 and 8, a contact shield 50 of insulation is provided at each terminal assembly 40 of the receptacle. The shield is movable between one position covering its terminal assembly (at the right in FIG. 6) and a raised position (at the left in FIG. 6) for providing access to the screw fastener 42, 48 of its related terminal assembly 40. When the fuse holder is in an energized circuit, contact shields 50 cover the contacts to avoid hazardous exposure of the contacts when the fuse carrier is removed. Shield wall 50a (FIG. 14) has slots 50b to admit the contact blades of the fuse carrier. Each shield has resilient detent arms 50c at its opposite-side edges for releasable cooperation either with recesses 52 or with recesses 54 (FIG. 6) of the receptacle walls 34a. Slot 50d in the shield is for a screw driver, to pry the shield out of its contact-covering position for access to screw fastener 42, 48. Shield 50 has opposite-side pivots 50e received in recesses in the receptacle walls 34a. After all work on screw fasteners 42, 48 is done, the raised shields are prominent reminders that they should be moved down over their terminal assemblies 40. Raised shields 50 obstruct the fuse carrier against being inserted and in this respect they are effective regardless of whether or not a fuse has been mounted in the fuse carrier.

The fuse carrier 32 (FIG. 5) basically includes a body 56 that may comprise multiple parts of molded insulation, dual lever 58, and U-shaped contacts 62. Fuse 60 has terminal brackets comprising arms 60a and 60b. Each fuse terminal and contact 62 are fastened together and to body 56 by a screw, as shown. Body 56 has a shallow downward-facing cavity defined by end walls 57 (FIG. 5) and side walls 59 (FIG. 7), in which the fuse is partly recessed. Each contact 62 has a pair of parallel blades 62a that are tightly gripped by contact pairs 44a, 44b of the receptacle when the fuse holder is in use. The engaged areas of these contacts and the tightness of their grip increase with higher current ratings of the fuse (or fuses) for which the fuse holder is rated.

The ends of fuse carrier 32 (FIG. 5) include external hooking formations 57a spaced from the front of the fuse carrier and pivotal abutments 57b that are close to the front of body 56. Each end wall 57 has an external relief or recess (as shown) between formations 57a and 57b of that end wall. When the dual lever 58 is operated, forcing the fuse carrier to tilt (as described below), the external recess at one end of body 56 accommodates hooking abutment 68 of the receptacle.

Dual lever 58 of the fuse carrier includes a top bridging portion 58a (see FIG. 1) that overlies body 56 and two parallel wide and thin and generally flat, resilient arms 58b. The outer surfaces of lever arms 58b are disposed against generally flat inner surfaces of the receptacle's side walls 34a when the fuse carrier is assembled to the receptacle. Aligned pivots 66 (integral portions of body 56) extend outward in opposite directions along an axis midway between contacts 62. Complementary holes in lever arms 58b receive pivots 66. The resilient lever arms 58b are forcibly spread apart when lever 58 is being assembled to pivots 66.

The top bridging portion 58a of the lever 58 has a cut-out (FIG. 1) that receives a generally complementary raised area 56a of body 56. Detents 58c fit in pits in formation 56a to hold the dual lever releasably in the position of FIG. 5 when the fuse carrier is free of the receptacle.

Both arms 58b of the dual lever have relieved areas that are bounded, in part, by respective shoulders 58d (FIGS. 2, 5 and 9). When the fuse carrier has been plugged into the receptacle and dual lever 58 in its detented position of FIG. 2, these shoulders 58d abut detents 38 of the receptacle walls and prevent the fuse carrier from being released due to shock or vibration. One pair of detents 38 or the other cooperates with shoulders 58d of the lever arms regardless of end-to-end reversal of the fuse carrier relative to the receptacle. When the carrier is being plugged into the receptacle, lever arms 58b are forced along slant surfaces 38a (FIG. 10) of the detents. Walls 34a flex outward until shoulders 58d reach and abut detent shoulders 38b. When the fuse holder is being removed from the receptacle, pivoting of arms 58b draws shoulders 58d away from detents 38 so that removal of the fuse carrier is not impeded.

Lever arms 58b have respective cam edges 58e (FIGS. 2 and 5) that cooperate with respective ribs 36 on the inside surfaces of walls 34a. Accordingly, dual lever 58 acts between pivots 66 and ribs 36 to drive the fuse carrier unit away from the receptacle unit when the lever is operated. Contacts of the fuse carrier are concomitantly released from contacts of the receptacle, as is discussed further below. The lever arms operate in a stable manner on pivots 66. However, any tendency that might develop for the lever arms to be forced off the ends of pivots 66 is counteracted by the confining walls 34a of the receptacle.

Hooking abutments 68 extend from body 34 of the receptacle at its upper margin (as shown in FIG. 6). Centering guides 70 for fuse carrier 32 extend below abutments 68. As the fuse carrier is being inserted into the receptacle, abutments 57a move along centering guides 70; and when the fuse carrier is fully inserted, hooking abutments 68 of the receptacle are opposite and close to pivotal abutments 57b of the fuse carrier. Cams 58e are near or against the cooperating ribs 36 of receptacle walls 34a. Fuse-carrier contact blades 62a are guided through slots 50b of shields 50.

FIGS. 11–13 illustrate the operation of the dual lever 58 in pulling the fuse carrier 32 out of the receptacle 30. FIG. 11 shows the fuse carrier in operative assembly to the receptacle, as in FIG. 2. Hooking abutments 68 of the receptacle are directly opposite to pivotal abutments 57b of the fuse carrier, and abutments 70 of the receptacle are directly opposite to hooking abutments 57a of the fuse carrier Each of the four contact blades 62a of the fuse carrier is tightly gripped by a receptacle contact assembly 44. There is a small amount of clearance between the side edges of each contact blade 62a and the ends of the slots 50b through which the blades extend.

Lever 58 is raised about its pivots 66 to raise the fuse carrier. The retentive grip of fuse-carrier blades 62a developed by contacts 44a, 44b at one end of the fuse holder inevitably is tighter than at the other end, at least slightly tighter. Accordingly, the action of cams 58e of the dual lever against ribs 36 forces the fuse carrier to tilt as blades 62a at one end of the fuse holder are released. At the other end, blades 62a remain gripped in contact pairs 44a, 44b. At the left in FIG. 12, the fuse carrier tilts about its pivotal abutment 57b bearing against abutment 68 of the receptacle.

Abutments 57a -to-57a are at the ends of one side of an imaginary rectangle and abutments 57b-to-57b terminate the opposite side of the rectangle. The diagonal X from left-end abutment 57b to the right-hand hooking abutment 57a is longer than the sides of the rectangle. Accordingly, as the fuse carrier tilts into its position in FIG. 12 its diagonal X carries its right-hand hooking abutment 57a into hooked engagement with the right-hand hooking abutment 68 of the receptacle.

Continued operation of dual lever 58 in the transition from FIG. 12 to FIG. 13 forcibly releases the left-hand contact blades 62a from the grip of their companion contact assembly 44. During this transition, cooperating abutments 57a and 68 tend to remain in interengagement until the contacts 62a at the left in FIG. 12 become released from their companion gripping contact pairs 44a, 44b.

In the configuration of the parts in FIG. 13, the contact blades 62a at both ends of the fuse carrier have been released from their companion contact assemblies 44. The fuse carrier 32 is freely removable from the receptacle.

It is evident that if the grip of the right-hand contacts were stronger than the grip of the left-hand contacts, the initial and final tilts of fuse carrier 32 would occur in the opposite sequence, compared to the sequence in FIGS. 11-13.

The fuse holder shown in FIGS. 1-3 is adapted for receiving wires at its terminals, and it is adapted to be mounted on a widely accepted standard form of so-called DIN mounting rail R. Wire shroud 72 (FIGS. 2, 3, 6, 8 and 22-24) is a one-piece plastic component that conforms to each end portion of molded body 34, at each terminal assembly 40. Wire shroud 72 includes a wire-shielding collar portion 72a having a wire-receiving bore 72b that is to admit an insulated wire (not shown). A bared end portion of the wire is to be gripped by clamp 42. The base portion of wire shroud 72 includes lateral rails 72c and integral arms comprising raised detents 72e and resilient U-shaped formations 72d.

At each end, receptacle body 34 has mutually opposite grooves 74 (FIG. 6) into which rails 72c can be slid, and body 34 has recesses 76 to receive detents 72e in the fully inserted condition of the wire shroud. Wire shroud 72 has a latch 72f at the inner end of the wire shroud's base portion. When wire shroud 72 is fully inserted, latch 72f underlies one margin of a mounting rail R on which the receptacle rests. The opposite margin of the mounting rail is captive in a retaining formation 78 of the molded body 34.

When wire shroud 72 at the right in FIG. 6 is fully inserted, rails 72c hold the shroud assembled to the bottom of the receptacle and detents 72e secure the wire shroud in its fully inserted position. Latch portion 72f complements the formation 78 to lock the fuse holder to rail R. A recess 72g at the top of the shroud is provided for a tool to be inserted for prying the shroud away from molded body 34. Formations 72d are compressed, latch 72f is retracted, and the fuse holder is freed from rail R, rails 72c sliding in grooves 74.

When shroud 72 is in place and a wire has been inserted, screw clamp 42, 48 can be operated to clamp an inserted wire against contact member 44. Access to screw 48 is provided by pivoting contact shield 50 into its raised position, as shown at the left in FIG. 6. Recesses 54 receive detent arms 50c, holding contact shield 50 releasably in its raised position. After an inserted wire is tightened, contact shield 50 is swung down over contact assembly 44. The raised shields are prominent indicators that they are not in their contact-protecting positions; and when raised, they obstruct the fuse carrier from being plugged in, regardless of whether or not a fuse is mounted in the fuse carrier. It is possible to insert the fuse carrier only after the shields are swung down in their contact-covering positions.

The fuse holder of FIGS. 1-3 may be equipped with a stud terminal at one end of the receptacle, replacing one wire shield 72, or stud terminals may replace both wire shields 72 of FIG. 2.

A stud terminal unit 80 is shown in FIGS. 28 and 29, including a closure of insulation 82 and a metal stud part 84. Closure 82 includes a tubular portion 82a and a wall portion 82b that is complementary to the same recess in each end of receptacle body 34 which otherwise would receive wire shroud 72. The metal stud part 84 includes a threaded shaft 84a, and connecting portion 84b, ending with terminal 84c that extends transverse to stud portion 84a. Connecting portion 84b provides a clearance space 84d for clamp 42. Ribs 82c are distributed around a bore in portion 82a that receives stud part 84. Ribs 82c grip stud part 84 and yet part 84 can be forced along the axis of threaded stud portion 84a. Wall portion 82b has an internal recess that accommodates connecting portion 84b.

Insulating closure 82 includes rail portions 82d that are receivable in opposite grooves 74 (FIGS. 6 and 27) of the receptacle body 34. In addition, insulating closure 82 includes oppositely directed integral resilient detents 82e. When stud terminal unit 80 is assembled to the receptacle as shown in FIGS. 25-27, detents 82e become latched to formations 86 (FIGS. 6 and 27) at the inner ends of the grooves that receive rail portions 82d.

When stud terminal unit 80 is first assembled to receptacle 30, clamp 42 is low in the receptacle and in position to admit terminal 84c in any non-critical position. Then, with shield 50 raised, clamp 42 is operated by screw 48 to draw terminal 84c firmly against the bottom of terminal member 44. As this proceeds, stud part 84a is drawn axially along its bore in insulating part 82. In FIG. 25, terminal 84c is shown as being drawn by clamp 42 only partway toward contact member 44.

FIG. 25 shows on stud terminal unit at the left-hand end of the fuse holder and a wire shroud 72 at the opposite end. Two stud terminal units may be used with receptacle 34, and (FIGS. 1-13) two wire shrouds may also be used.

The fuse holder of FIGS. 1–13 is formed to carry one fuse, providing protection for a single current path. Multiple fused circuits are commonly protected by fuse holders having provision for mounting multiple fuses and having a spaced-apart pair of contacts for each fuse. Correspondingly greater effort is required to pull a fuse carrier bearing multiple fuses out of its receptacle than is needed in the case of a fuse carrier having a single fuse. The mechanism shown and described in FIGS. 1–13 is readily applicable to fuse holders for multiple fuses.

Multiple single-fuse fuse holders of the form in FIGS. 2–13 can be combined and coordinated to serve as a multiple-fuse fuse holder. FIG. 1 includes a second fuse carrier 32', the same in all respects as fuse carrier 32 in FIGS. 1–13. Both fuse holders have their respective receptacles, and they have their respective dual levers 58, 58'. A splined link 88 (see also FIG. 26) on ribs 58e of respective bridging portions 58a and 58a' unifies the dual levers. In addition, the fuse carriers 32, 32' have aligned slots 73a (FIG. 25) that contain bridging tabs 73 (FIG. 1). Accordingly, the dual levers 58 and 58' are constrained to move in unison and tabs 73 provide assurance of the fuse-carrier bodies 56 remaining aligned.

FIGS. 30 and 31 show a modified fuse holder in which the fuse carrier does not tilt as it is being removed and in which the opposite-end contacts become released at the same time. FIGS. 30 and 31 represent a fuse carrier 132 and a receptacle 130 that are identical to fuse carrier 32 and receptacle 30 except that the various abutments 57a, 57b, 68 and 70 are omitted. Slide guides are provided on the fuse carrier and the receptacle that enforce bodily movement of the fuse holder along a path perpendicular to the length of the fuse(s) in the fuse holder. The parts bearing the "100"-series reference numerals have the same construction and purpose as those with corresponding numerals below 100, so that their description and discussion are largely omitted as redundant.

In FIG. 30, side walls 159 of the fuse carrier flank fuse 160 and are received between walls 134a of the receptacle. Each side wall 159 has a slot 190 perpendicular to the length of fuse 160, midway between fuse carrier contacts 162. Pivot 166 is also midway between contacts 162 so that the upward thrust developed by operation of levers 158 develops a contact-releasing force that is approximately balanced between the contacts. Each wall 134 of the receptacle has an inward-projecting rib 192 that is received slidably in slot 190 of the fuse carrier, providing straight-line guidance for the fuse carrier as it is driven out of the receptacle.

The embodiment of FIGS. 1–13 is more compact than that of FIGS. 30 and 31 in that it does not require space for walls 159 at opposite sides of the fuse, and the effort involved in tilting the fuse carrier of FIGS. 1–13 for releasing the contacts at one end of the fuse holder is less than that required for simultaneously releasing the contacts at the opposite ends of the fuse as occurs in the fuse holder of FIGS. 30 and 31. However, the fuse holder of FIGS. 30 and 31 provides a great reduction in the pull required for removing the fuse carrier from its receptacle, as compared to the pull needed for removing the fuse carrier of a conventional fuse holder from its receptacle.

The novel fuse holders described above and shown in the accompanying drawings can thus be more compact than conventional fuse holders with finger-grips for pulling the fuse carriers out of the receptacles. A lever or a dual lever greatly reduces the effort needed to pull a fuse carrier free of its receptacle, and it greatly reduces the stress on the devices used to fasten fuse holders to a panel. Multiple single-fuse holders can be ganged to operate in unison, to replace a single fuse holder that contains multiple fuses. Moreover, a multiple-fuse fuse holder can be modified to incorporate devices to reduce drastically the force required to free its fuse carrier from its receptacle. The novel fuse holders can be fabricated for use both as end-wired devices and as rear stud mounted devices.

Certain of the novel aspects of the novel fuse holder and the modifications detailed above may be utilized apart from others, and further modifications will be apparent to those skilled in the art. Consequently, the appended claims should be construed broadly in accordance with the spirit and scope of the invention.

What is claimed is:

1. A fuse holder including a fuse-carrier unit for receiving and retaining at least one cartridge fuse, said fuse-carrier unit having a fuse-carrier body of molded insulation and bearing a pair of widely spaced-apart fuse-carrier contacts, each said fuse-carrier contact being one of (a) a contact that forms part of the fuse-carrier unit and (b) a terminal of a cartridge fuse when received by the fuse-carrier unit, a receptacle unit including a receptacle body of molded insulation having a cavity for receiving said fuse-carrier unit and having a pair of widely spaced-apart receptacle contacts companion to said fuse-carrier contacts for tight engagement with the latter, and means for releasing the fuse carrier from the receptacle, said releasing means including a manually actuated device carried by one of said units and being arranged to act on both of said units oppositely for developing manual force-multiplied effort for driving said units away from each other and for forcing the disengagement of at least one of said fuse-carrier contacts from its companion receptacle contact.

2. A fuse holder as in claim 1, wherein said manually actuated device includes a lever or levers pivoted at an axis to one of said units and arranged to bear against the other of said units.

3. A fuse holder as in claim 1, wherein each of said bodies of molded insulation has opposite side portions at opposite sides of a space in which a fuse may be disposed, and wherein said manually actuated device includes a pair of levers fixed to each other and pivoted to said opposite side portions, respectively, of one of said bodies and being arranged to bear against said opposite side portions, respectively, of the other of said bodies.

4. A fuse holder as in claim 1, wherein said releasing means includes a pair of levers separated from each other by a space in which at least one fuse may be disposed, said levers being unified and operable together, said levers being pivoted at an axis to one of said units and having thrust applying portions acting on the other of said units.

5. A fuse holder as in claim 2 or claim 4, wherein said fuse-carrier unit tilts and one of said fuse-carrier contacts is concomitantly released from its companion receptacle contact in response initially to the operation of said manually actuated device, each of said units having a pair of widely spaced-apart abutments, the abutments of the fuse-carrier unit being spaced from the receptacle-unit abutments when the fuse-carrier contacts are in engagement with the receptacle contacts and one of the abutments of the fuse-carrier unit obstructing its companion receptacle-unit abutment when one of the fuse carrier contacts is disengaged from its companion receptacle contact, ensuing operation of the manually operable device enforcing reversed tilting of the fuse carrier unit about the mutually engaged abutments and enforcing release of the other of said fuse-carrier contacts from its companion receptacle contact.

6. A fuse holder as in claim 2 or claim 4
  wherein said axis is at least approximately midway between said widely spaced-apart fuse-carrier contacts and receptacle contacts in the assembled condition of the fuse holder, and wherein the initial operation of the lever or levers causes the release of one or the other of said widely spaced-apart fuse-carrier contacts from its companion receptacle contact and causes the fuse carrier to tilt while the other of said fuse-carrier contacts and its companion receptacle contact remain in tight engagement with one another, and
  wherein said fuse carrier unit has hooking fuse-carrier abutments in proximity to the respective fuse-carrier contacts, the hooking fuse-carrier abutments being spaced apart along a first side of an imaginary rectangle and wherein said receptacle unit has hooking receptacle abutments companion to the fuse-carrier abutments, respectively, the hooking receptacle abutments being spaced apart along another side of the rectangle parallel to said first side of the rectangle, the hooking fuse-carrier abutments being disposed deeper in the receptacle than the hooking receptacle abutments when the fuse-carrier contacts are in engagement with their companion receptacle contacts, and
  wherein said fuse carrier unit has pivotal abutments which are directly opposite to the hooking receptacle abutments, respectively, when the fuse-carrier contacts are in engagement with the receptacle contacts, all of said abutments being related so that, when the fuse carrier unit is being tilted, it pivots about one or the other of its pivotal abutments in cooperation with a corresponding one of said hooking receptacle abutments and so that the other hooking fuse-carrier abutment comes into engagement with its companion hooking receptacle abutment,
  ensuing operation of said lever or levers enforcing reverse tilting of the fuse-carrier unit about the mutually engaged hooking abutments and causing release of the other of said spaced-apart fuse-carrier contacts from its companion receptacle contact.

7. A fuse holder as in claim 1, wherein said units include cooperative guide formations that prevent tilting of the fuse-receptacle unit when said units are being driven away from each other.

8. A fuse holder as in claim 2 or claim 4, wherein said axis is at least approximately midway between said widely spaced-apart fuse-carrier contacts and receptacle contacts in the assembled condition of the fuse holder, and wherein said units have cooperative guide formations for preventing the fuse-carrier unit from tilting relative to the receptacle unit when said units are being driven away from each other.

9. A fuse holder as in claim 3, wherein the body of said fuse carrier has pivots at opposite sides thereof for supporting said levers, said receptacle having side walls that flank said levers and said pivots when the fuse carrier is assembled to the receptacle, said walls then constituting obstructions against shift of the levers off said pivots.

10. A fuse holder including a fuse-carrier unit for receiving and retaining at least one cartridge fuse; said fuse-carrier unit bearing spaced-apart fuse-carrier contacts and a receptacle unit for receiving the fuse-carrier unit and having mutually spaced-apart receptacle contacts for tight engagement with the fuse-carrier contacts, respectively, so as to form pairs of companion contacts that are spaced apart, and a lever pivoted to one of said units and arranged to drive said units away from each other so as to part the contacts of at least one companion pair of contacts, said units and the lever being so related to each other that the fuse-carrier unit tilts in response to the operation of the lever and causes one pair of companion contacts to be released from each other while the companion contacts of the other pair remain in tight engagement.

11. A fuse holder as in claim 10 wherein said lever is pivoted to said fuse-carrier unit on an axis approximately midway between the fuse-carrier contacts and transverse to the direction along which the fuse-carrier contacts are spaced apart.

12. A fuse holder as in claim 10 or 11 wherein each of said units has opposite-end abutments in general proximity to its contacts respectively, an abutment of each unit being opposite to and spaced from a corresponding abutment of the other unit when the companion contacts of each pair are in mutual engagement but those opposite-end abutments which are in proximity of a released pair of companion contacts becoming engaged with each other and the fuse-carrier unit becoming tilted, ensuing operation of said lever causing the fuse-carrier unit to tilt reversely about the engaged abutments for releasing the other pair of companion contacts.

13. A pair of fuse holders as in claim 10 fixedly assembled side-by-side, including means linking the levers thereof for movement in unison.

14. A pair of fuse holders as in claim 11, including means linking the levers thereof for movement in unison, and means linking the fuse carrier bodies for maintaining corresponding relationships between said levers and their related fuse carrier bodies during operation of the levers.

15. A fuse holder including a fuse carrier for a cartridge fuse, the fuse carrier having spaced-apart blade contacts, and a receptacle having spaced-apart receptacle contacts for tight engagement with respective fuse-carrier contacts, said receptacle including a body of insulation having a forward-opening cavity for receiving the fuse carrier and opposite-end openings at which circuit conductors may be inserted, screw-clamps operable from the front of the receptacle for securing inserted conductors to the receptacle contacts, respectively, and respective shields for the receptacle contacts pivoted to said receptacle and movable between respective operating positions largely overlying and shielding the receptacle contacts against access when the fuse carrier is removed from the receptacle but having openings enabling the fuse-receptacle blade contacts to engage the receptacle contacts, said pivoted shields being pivotally movable away from said receptacle contacts and into erect positions to provide manipulative access to said screw clamps, said shields when in their erect positions obstructing the cavity against insertion of the fuse carrier and constituting prominent indicators of the unshielded state of the receptacle contacts.

16. A fuse holder including a fuse carrier for at least one cartridge fuse and a receptacle including a body of electrical insulation, said body having a front-opening cavity for receiving said fuse carrier and said body having a recess in its rear for admitting and retaining one margin of a mounting rail, said receptacle having a pair of spaced-apart receptacle contacts and screw clamps for securing circuit connections to said receptacle contacts, respectively, said receptacle being apertured for admitting a connecting wire to at least one of said clamps, and a shroud of insulation for shielding a wire entering said body when a bared end portion of the wire is received in one of said screw clamps, said insulating shroud having releasable formations for holding such shroud in wire-shielding assembly to said receptacle body and said insulating shroud having a detent portion for cooperating with a margin of the aforementioned mounting rail at the side thereof opposite to said first margin for releasably securing said receptacle to the mounting rail.

17. A fuse holder including a fuse carrier for at least one cartridge fuse and a receptacle having a front-opening cavity for receiving said fuse carrier, said receptacle having a spaced-apart pair of receptacle contacts, clamps for securing inserted circuit connections to said receptacle contacts and said receptacle having opposite-end openings for admitting circuit connections to said clamps, and at least one terminal unit for providing a connection to a respective one of said receptacle contacts, said terminal unit including a terminal member having a hook formation adapted to enter one of the end openings in the receptacle body and to extend into and be gripped by one of said clamps, said terminal member having a threaded stud portion extending rearward of said receptacle when said hook formation is gripped by one of said clamps, and said terminal unit bearing a closure of insulation for one of said opposite-end openings of the receptacle and said closure extending as a shroud for a portion of said terminal member adjacent to the receptacle body.

18. A fuse holder as in claim 17, further including a wire shield of insulation at the other of said opposite-end openings, said wire shield having formations retaining the wire shield assembled to said receptacle body and having a bore for admitting a connecting wire to one of said clamps.

* * * * *